Jan. 19, 1926.

1,570,321

J. T. SWEENEY

SKIMMING SPOON

Filed August 4, 1922

John T. Sweeney   INVENTOR

BY Frank P. Wentworth his ATTORNEY.

Patented Jan. 19, 1926.

1,570,321

UNITED STATES PATENT OFFICE.

JOHN T. SWEENEY, OF KINGSTON, NEW YORK.

SKIMMING SPOON.

Application filed August 4, 1922. Serial No. 579,589.

*To all whom it may concern:*

Be it known that I, JOHN T. SWEENEY, a citizen of the United States, residing at Kingston, in the county of Ulster and State of New York, have invented certain new and useful Improvements in Skimming Spoons, of which the following is a specification, reference being had therein to the accompanying drawings, which form a part thereof.

My invention relates to skimming spoons, and more particularly to a utensil of this type adapted for use in removing fluid grease from the top of the liquid contents of a pot or pan without removing with it, any material quantity of the liquid.

A spoon embodying my invention is so constructed that the bottom of the bowl may be immersed in the liquid, the spoon being provided with an overhung edge adapted to be brought in close proximity to the surface of the liquid without being immersed therein, and having the effect of directing the grease through an opening in the side of the bowl directly beneath the overhung edge which serves as a guide to the housewife to prevent the bowl being forced into the liquid to an extent greater than that required to merely skim the surface of the liquid upon which the grease is floating.

While the utensil is particularly adapted for removing, or skimming, grease from the top of the liquid, it may also be used as an ordinary spoon.

The handle of the spoon preferably is so bent as to permit the bowl to be brought, in a horizontal position, upon the liquid, so as to permit the grease to be removed from an area corresponding with substantially the entire length of the slot above referred to, by a movement upon a horizontal plane, the end of the spoon being imperforate so that if desired the grease may be poured from the spoon without likelihood of the fouling of the opening in the event of the metal of the bowl, or the grease itself, becoming sufficiently chilled to cause partial solidification of the grease.

The invention consists primarily in a skimming spoon embodying therein a handle and a bowl having a slot toward the top thereof and a substantially straight part deflected outwardly of the bowl from substantially the top of said slot, whereby grease or scum will be directed through said slot to within the bowl and in such other novel features of construction and characteristics as are hereinafter set forth and described, and more particularly pointed out in the claims hereto appended.

Referring to the drawings.

Like letters refer to like parts throughout both of said views.

Figure 1:
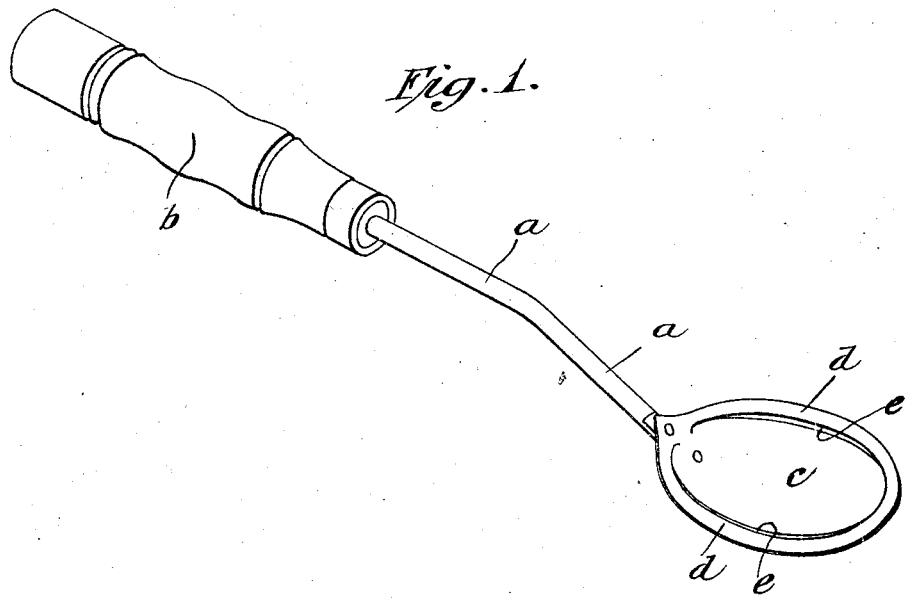
Fig. 1 is a perspective view of a spoon embodying my invention.
Figure 2:
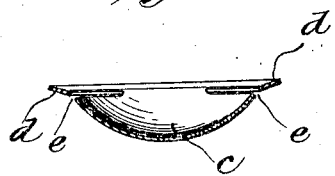
Fig. 2 is a transverse section through the bowl.

In the embodiment of my invention shown in the drawings, the spoon consists of a handle including a shank $a$ having a grip $b$ at one end thereof, and a deep bowl $c$ secured to the other end thereof, which bowl is preferably made of sheet metal drawn to form.

A side edge, or preferably both side edges, of the bowl $c$ are provided with a substantially straight part or lip $d$ deflected outwardly thereof from substantially the top of a slot or slots $e$ formed adjacent the top of said bowl upon either or both side edges thereof, said part or lip extending throughout a substantial portion of the length of the bowl. This overhung part or lip may project at substantially right angles to the edge of the bowl, or at a slight incline, as desired.

The sides of the bowl closely adjacent the overhung edge or lip $c$ is slotted at $e$ as described, said slot being narrow, but extending for a length substantially coincident with that of the overhung or outwardly deflected part or lip. While I provide both sides of the spoon with an overhung or outwardly deflected part or lip $d$ and a slot $e$, it is apparent that this construction may be limited to one side of the spoon only, the duplication of these characteristics in the spoon being largely a matter of convenience so as to permit the actuation of the spoon by movement in either direction.

The bowl $c$ should project from the shank $a$ at an angle which will permit the bottom of the bowl to be brought flatwise upon the top of the liquid in a pot or pan, to meet which condition, I provide the shank $a$ of the handle with a downwardly and forwardly turned portion $a'$ to which the bowl $c$ is secured, the bowl projecting from this downturned portion at a slight upward angle.

The overhung or outwardly deflected part or lip may be extended across the end of the spoon if so desired, although this is immaterial to the invention.

The bowl c is substantially elliptical in shape, which construction I have found most satisfactory, although I do not desire to limit my invention to the exact configuration of the bowl so long as it is fairly deeply drawn and has the overhung side edges or lips with the slot at the side of the bowl closely adjacent said overhung edge or lip.

The grip b is preferably made of wood or other heat insulating material.

In use, when it is desired to remove fluid grease from the liquid in a pot or pan, the bowl c is brought flatwise upon the top of the liquid to be skimmed, forced downwardly until the lower edge of the slot or slots e is or are below the upper plane of the grease or scum, and the overhung or outwardly deflected part or lip d is rested substantially on the top of the grease. The bowl is then moved along the top of the liquid, the part or lip d forcing the grease toward the slot e, and the undercurved surface of the bowl having a tendency to displace the liquid and force the grease upwardly toward the part or lip d. The grease when brought to this position will either flow or be forced through the slot and accumulate in the bowl, which has sufficient capacity to permit a continued skimming operation.

By duplicating the overhung or outwardly deflected part or lip d, and slot e upon opposite sides of the bowl, the bowl may be moved in either direction.

By reason of the length of the slots e and the substantially horizontal position of the bowl c while in use, a considerable surface may be skimmed at one time, the arrangement of parts being such as to cause little likelihood of the liquid in the pot or pan entering the bowl.

When the bowl has been filled with the grease, it may be poured therefrom at the end of the bowl, or by merely inverting the bowl, it being desirable to avoid the emptying of the bowl through the slots e, owing to the likelihood of grease, when slightly chilled, to adhere to the edges of the slots and thus interfere with the subsequent use of the spoon, or the frequent cleaning thereof.

While a spoon of my invention is particularly adapted for skimming purposes, it is apparent that it is also capable of general use.

It is not my intension to limit the invention to the precise details of construction shown in the drawings, it being apparent that such may be varied without departing from the spirit and scope of the invention.

Having described the invention, what I claim as new and desire to have protected by Letters Patent, is:—

1. A skimming spoon embodying therein a handle and a bowl having a slot toward the top thereof and a substantially straight part deflected outwardly of the bowl from substantially the top of said slot, whereby grease or scum will be directed through said slot to within the bowl.

2. A skimming spoon embodying therein a handle having a metal shank, a portion of which adjacent one end thereof projects downwardly and forwardly, and a bowl projecting at an angle to said last named portion which will permit it to be brought substantially flatwise upon the liquid contents of a pot or pan, said bowl having a slot toward the top thereof and a substantially straight part deflected outwardly of the bowl from substantially the top of said slot, whereby grease or scum will be directed through said slot to within the bowl.

3. A skimming spoon embodying therein a handle having a metal shank, a portion of which adjacent one end thereof projects downwardly and forwardly, and a sheet metal bowl secured to said downwardly and forwardly projection portion having slots therethrough at opposite sides thereof, substantially straight parts deflected outwardly of the bowl from substantially the top of said slots respectively, whereby grease or scum will be directed through said slots to within the bowl, and an imperforate portion at the end of the spoon between said slots, said bowl projecting at an angle to said shank to permit it to be brought flatwise upon the liquid contents of a pot or pan.

In witness whereof I have hereunto affixed my signature, in the presence of two subscribing witnesses, this 2nd day of August, 1922.

JOHN T. SWEENEY.